United States Patent
Shimizu

(10) Patent No.: US 11,212,414 B2
(45) Date of Patent: Dec. 28, 2021

(54) IMAGE READING APPARATUS AND IMAGE READING METHOD

(71) Applicant: SEIKO EPSON CORPORATION, Tokyo (JP)

(72) Inventor: Tomokazu Shimizu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/598,681

(22) Filed: Oct. 10, 2019

(65) Prior Publication Data

US 2020/0120229 A1 Apr. 16, 2020

(30) Foreign Application Priority Data

Oct. 11, 2018 (JP) .............................. JP2018-192348

(51) Int. Cl.
*G06F 15/00* (2006.01)
*H04N 1/203* (2006.01)
*H04N 1/00* (2006.01)

(52) U.S. Cl.
CPC ....... *H04N 1/2032* (2013.01); *H04N 1/00649* (2013.01); *H04N 1/00933* (2013.01)

(58) Field of Classification Search
CPC ............. H04N 1/2032; H04N 1/00649; H04N 1/00933
USPC ....................................................... 358/474
See application file for complete search history.

(56) References Cited

U.S. PATENT DOCUMENTS

| | | | | |
|---|---|---|---|---|
| 5,689,347 A | * | 11/1997 | Naoi ...................... | H04N 1/203 358/444 |
| 2011/0075227 A1 | * | 3/2011 | Watanabe .............. | H04N 1/203 358/474 |
| 2011/0267662 A1 | * | 11/2011 | Kusunoki .............. | H04N 1/031 358/483 |
| 2011/0286051 A1 | | 11/2011 | Yamakita | |
| 2017/0003952 A1 | * | 1/2017 | Nakahara ........... | H04N 1/00933 |

FOREIGN PATENT DOCUMENTS

JP 2011244169 12/2011

* cited by examiner

*Primary Examiner* — Mark R Milia
(74) *Attorney, Agent, or Firm* — Workman Nydegger

(57) ABSTRACT

An image reading apparatus includes a first reading section configured to read a first plane of the document, a second reading section configured to read a second plane which is a back side of the first plane, a first controller stops the reading of the first reading section after causing the first reading section to read a last line before the reading of the first reading section is stopped and transmits a reading stop instruction to a second controller earlier than a timing when the first reading section reads the last line by a time difference corresponding to a delay generated in communication between the first and second controllers. The second controller stops reading of the second reading section after causing the second reading section to read one line in response to the reading stop instruction.

6 Claims, 5 Drawing Sheets

IMAGE READING APPARATUS AND IMAGE READING METHOD

The present application is based on, and claims priority from JP Application Serial Number 2018-192348, filed Oct. 11, 2018, the disclosure of which is hereby incorporated by reference herein in its entirety.

BACKGROUND

1. Technical Field

The present disclosure relates to an image reading apparatus and an image reading method.

2. Related Art

An image reading apparatus which stops a sheet feeding motor so that reading is stopped when a buffer which temporarily stores read image data before being transferred to a host, such as a personal computer, is nearly full is disclosed (refer to JP A-2011-244169).

Image reading apparatuses may employ a configuration in which both sides of a document are simultaneously read. The configuration for simultaneously reading both sides includes a sensor which reads one side of a document, a sensor which reads the other side of the document, and two controllers which control the respective sensors. Each of the two controllers includes a central processing unit (CPU). In a case where an instruction for stopping reading is transmitted to one of the controllers to the other of the controllers so that reading of the document is stopped, a timing when the one of the sensors stops the reading and a timing when the other of the sensors stops the reading is shifted from each other due to a delay in communication between the controllers. This shift causes adverse effects on image quality of a result of reading on the both sides of the document.

SUMMARY

According to an aspect of the present disclosure, an image reading apparatus which simultaneously reads both sides of a document includes a first reading section configured to read a first plane of the document in a unit of line, a second reading section configured to read a second plane which is a back side of the first plane of the document in a unit of line, a first controller configured to control the first reading section, and a second controller configured to control the second reading section in accordance with an instruction issued by the first controller. When determining stop of reading of the document, the first controller stops the reading performed by the first reading section after causing the first reading section to read a last line before the reading performed by the first reading section is stopped and transmits a reading stop instruction to the second controller earlier than a timing when the first reading section reads the last line by a time difference corresponding to a delay generated in communication between the first and second controllers. The second controller stops reading performed by the second reading section after causing the second reading section to read one line in response to the reading stop instruction.

DESCRIPTION OF EXEMPLARY EMBODIMENTS

Hereinafter, an embodiment of the present disclosure will be described with reference to the accompanying drawings. The drawings are merely examples for describing the embodiment.

1. Schematic Configuration of Image Reading Apparatus

Figure 1:
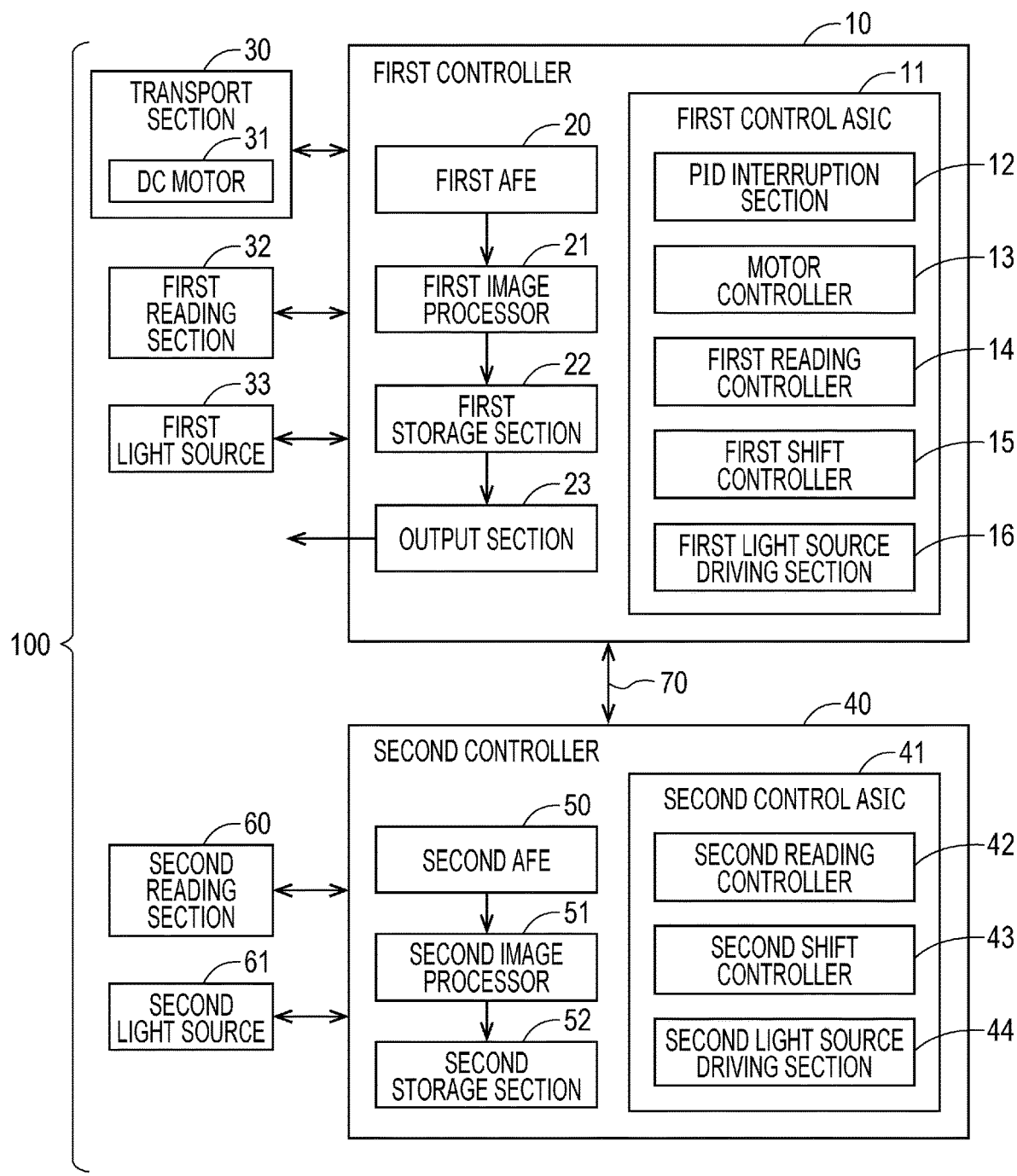
FIG. 1 is a block diagram schematically illustrating a configuration of an image reading apparatus.

FIG. 1 is a diagram schematically illustrating a configuration of an image reading apparatus 100 according to this embodiment. The image reading apparatus 100 is a scanner capable of simultaneously reading both sides of a document. Meaning of the simultaneous reading performed on both sides of a document includes, in addition to a case where a period of time when one side of a document is read and a period of time when the other side of the document is read coincide with each other, a case where a portion of the period of time when one side of the document is read and a portion of the period of time when the other side of the document is read overlap with each other. One side of the document is referred to as a first plane and the other side of the document is referred to as a second plane.

The image reading apparatus 100 includes a transport section 30 which transports a document, not illustrated, a first reading section 32 which reads a first plane of the document, a first light source 33 which irradiates the first plane of the document with light, and a first controller 10 which controls the transport section 30, the first reading section 32 and the first light source 33. The image reading apparatus 100 further includes a second reading section 60, a second light source 61 which irradiates a second plane of the document, and a second controller 40 which controls the second reading section 60 and the second light source 61.

The first plane of the document is read under control of the first controller 10 and the second plane of the document is read under control of the second controller 40. Note that the first controller 10 and the second controller 40 do not have an equal relationship, that is, the second controller 40 controls the second reading section 60 in accordance with an instruction issued by the first controller 10. Accordingly, the first controller 10 may be referred to as a master controller and the second controller 40 may be referred to as a slave controller. The image reading apparatus 100 may be a multifunction peripheral having a plurality of functions, such as a printer function, in addition to a scanner function.

The transport section 30 is a mechanism which transports a document from an upstream side to a downstream side of the transport and includes a roller used to transport the document and a DC motor 31 used to rotate the roller, for example. The document transported by the transport section 30 is read by the first reading section 32 and the second reading section 60. Therefore, the image reading apparatus 100 corresponds to a sheetfed scanner. The transport section 30 may be referred to as an auto document feeder (ADF). The DC motor 31 includes an encoder which outputs a pulse in accordance with an amount of transfer of the document.

The first light source 33 is a light emitting diode (LED), for example. The first light source 33 generates light of three colors of red (R), green (G), and blue (B), in predetermined order, such as order of first to third colors. For example, the first light source 33 emits light in order of R, G, and B. Therefore, in this embodiment, in R, G, and B, R corresponds to the first color, G corresponds to the second color, and B corresponds to the third color. Specifically, the first light source 33 has a red LED, a green LED, and a blue LED as light sources, and repeatedly turns on the read LED, the green LED, and the blue LED in this order.

The first reading section 32 is a monochrome image sensor which receives reflection light generated by reflecting light emitted from the first light source 33 by the first plane of the document, accumulates charge corresponding to an amount of received light, and transmits the accumulated charge to the first controller 10 as image data. The first reading section 32 includes a plurality of sensor chips arranged in a main scanning direction. The main scanning direction intersects with a direction in which the document is transported by the transport section 30. Although the term "intersect" means orthogonal intersection in this embodiment, the term may include a margin of error caused by deteriorated accuracy of actual attachment of members or the like, in addition to the strict orthogonal intersection. That is, the first reading section 32 is a line sensor having a length which covers a width of the document in the main scanning direction.

The sensor chips included in the first reading section 32 have the same configuration as a contact image sensor (CIS) or a charge coupled device (CCD) image sensor. Specifically, each of the sensor chips includes a photoelectric conversion element, a shift gate, and a shift register. Then each of the sensor chips transfers charge accumulated in the photoelectric conversion element to the shift register through the shift gate which is opened, and the shift register moves the charge in turn to be output.

The open of the shift gate (transfer of the charge) is performed in response to a shift pulse serving as a control signal applied from a first control application specific integrated circuit (ASIC) 11 described below. The photoelectric conversion element accumulates the charge corresponding to an amount of received light, and therefore, a timing when the charge is transferred to the shift register corresponds to a timing when accumulation of charge of light of a next emitted light color is started. The charge transferred to the shift register is converted into analog data by an output section at an end of the shift register and transmitted to a first analog front end (AFE) 20 of the first controller 10.

In this embodiment, image data in a unit of line read by each of the sensor chips included in the line sensor at one time is referred to as line data for convenience sake. Furthermore, line data of the first color is referred to as first line data, line data of the second color is referred to as second line data, and line data of the third color is referred to as third line data. As described above, in the case where R is the first color, G is the second color, and B is the third color, charge which is accumulated in the photoelectric conversion elements of the sensor chips when the red LED is emitted and which is transferred to the shift registers corresponds to the first line data. Similarly, the charge which is accumulated in the photoelectric conversion elements of the sensor chips when the green LED is emitted and which is transferred to the shift registers corresponds to the second line data. The charge which is accumulated in the photoelectric conversion elements of the sensor chips when the blue LED is emitted and which is transferred to the shift registers corresponds to the third line data.

The first controller 10 includes a CPU serving as a main controller, a read only memory (ROM) storing programs and the like, a random access memory (RAM) temporarily storing data and the like as a main memory, application specific integrated circuits (ASICs) designed to be dedicated for various processes, and other electronic circuit components. The first controller 10 may be configured as a system on a chip (SoC).

The first controller 10 includes the first control ASIC 11, the first AFE 20, a first image processor 21, a first storage section 22, and an output section 23. Furthermore, the first control ASIC 11 includes a PID interruption section 12, a motor controller 13, a first reading controller 14, a first shift controller 15, and a first light source driving section 16.

The PID interruption section 12 performs interruption in a predetermined cycle during PID control performed by the motor controller 13 on the DC motor 31 of the transport section 30 and performs various calculations so that the DC motor 31 attains a target speed. For example, the PID interruption section 12 calculates a speed deviation between the target speed of the DC motor 31 and an actual speed based on an output of the encoder and performs calculation of a proportional element, an integrator element, and a derivative element based on the deviation. Then a control value (a Duty ratio) is determined based on a result of the calculation such that the actual speed of the DC motor 31 coincides with the target speed and the control value is transmitted to the motor controller 13.

The motor controller 13 performs the PID control on the DC motor 31 based on the transmitted control value so as to cause the transport section 30 to transport a document. The motor controller 13 may perform "constant-speed drive", "deceleration drive", "stop control", "drive termination control", "drive preparation control", and "acceleration drive" on the DC motor 31. The "constant-speed drive" indicates rotation of the DC motor 31 in a constant speed. The "deceleration drive" indicates gradual deceleration of a rotation speed of the DC motor 31. The "stop control" indicates control for maintaining a stop state in which rotation of the DC motor 31 is stopped. The "drive termination control" indicates control for blocking power supply to the DC motor 31. The "drive preparation control" indicates control for starting or restarting power supply to the DC motor 31. The "acceleration drive" indicates gradual acceleration of the rotation speed of the DC motor 31.

The first reading controller 14 controls reading performed by the first reading section 32. Specifically, the first reading controller 14 transmits a shift pulse as a trigger to the first reading section 32 and controls transfer of the charge accumulated in the photoelectric conversion elements to the shift registers. Furthermore, the first reading controller 14 controls output of the charge stored in the shift registers of the first reading section 32 to the first AFE 20. Furthermore, the first reading controller 14 transmits an instruction to the first image processor 21 so that digital data which has been subjected to various correction processes or the like performed by the first image processor 21 is stored in the first storage section 22.

The first shift controller 15 generates a shift pulse, and controls various sections included in the first control ASIC 11 based on the shift pulse. The first shift controller 15 generates a shift pulse to be transmitted from the first reading controller 14 to the first reading section 32. For example, the first shift controller 15 generates a shift pulse serving as a trigger for start of reading which is performed by the first reading section 32 for the first time after the start of driving of the DC motor 31. Furthermore, the first shift controller 15 generates a shift pulse serving as a trigger for transfer of charge accumulated in the photoelectric conversion elements of the first reading section 32 to the shift registers.

Furthermore, the first shift controller 15 generates a shift pulse which is a trigger for turning on of the red LED, the green LED, and the blue LED included in the first light source 33 in turn. The first light source driving section 16 controls turning on of the first light source 33 in accordance with a reading operation performed by the first reading section 32 based on the shift pulse generated by the first shift controller 15. Specifically, the first light source driving section 16 turns on the red LED, the green LED, and the blue LED included in the first light source 33 in turn at a timing when the shift pulse is supplied from the first reading controller 14 to the first reading section 32. Note that light emission times of the individual colors of the LED are determined in advance, and when the predetermined times have elapsed, the LEDs are turned off.

The first AFE 20 converts analog data output from the first reading section 32 into digital data. The first image processor 21 performs predetermined correction, such as shading correction, and predetermined conversion on the digital data output from the first AFE 20 before outputting the digital data. Furthermore, the first image processor 21 generates image data corresponding to a single raster line of the document based on first to third line data which are digital data successively output from the first reading section 32 through the first AFE 20. Specifically, the first image processor 21 generates image data configured by pixel columns including pixels having digital values of R, G, and B arranged in the main scanning direction by combining a set of line data including the first to third line data which are successively output or interpolating R, G, and B values.

With this configuration, the first controller 10 may repeatedly obtain one set of image data including the first to third line data by causing the first reading section 32 to repeatedly read the first to third line data in this order from the first plane of the document. Furthermore, although the second controller 40 is described hereinafter, the second controller 40 may also repeatedly obtain one set of image data including first to third line data by causing the second reading section 60 to repeatedly read the first to third line data in this order from the second plane of the document.

The first storage section 22 functions as a buffer which temporarily stores digital data which is being processed by the first image processor 21 or which has been processed by the first image processor 21. The first storage section 22 supplies the temporarily-stored digital data to the output section 23 in a first-in first-out (FIFO) method.

The second controller 40 includes a CPU which performs main control, a ROM storing programs and the like, a RAM temporarily storing data and the like as a main memory, ASICs designed to be dedicated for various processes, and other electronic circuit components. The second controller 40 may be configured as an SoC.

The second controller 40 includes a second control ASIC 41, a second AFE 50, a second image processor 51, and a second storage section 52. Furthermore, the second control ASIC 41 includes a second reading controller 42, a second shift controller 43, and a second light source driving section 44. The descriptions of the first reading section 32, the first light source 33, the first control ASIC 11 (the first reading controller 14, the first shift controller 15, and the first light source driving section 16) of the first controller 10, the first AFE 20, the first image processor 21, and the first storage section 22 which are components used to read the first plane of the document are employed for the second reading section 60, the second light source 61, the second control ASIC 41 (the second reading controller 42, the second shift controller 43, and the second light source driving section 44) of the second controller 40, the second AFE 50, the second image processor 51, and the second storage section 52 which are components used to read the second plane of the document.

The first controller 10 controls turning on of the first light source 33 and start and stop of a reading operation performed by the first reading section 32 in accordance with a pulse output from the encoder, that is, a driving state of the DC motor 31. On the other hand, the second controller 40 serving as a slave controls turning on of the second light source 61 and start and stop of a reading operation performed by the second reading section 60 based on an instruction issued by the first controller 10 serving as a master. The first controller 10 and the second controller 40 communicate with each other through a connection line 70 which connects the first controller 10 and the second controller 40 to each other. With the configuration of FIG. 1, start of generation of a shift pulse described above is instructed from the first controller 10 to the second shift controller 43 of the second controller 40, and therefore, the second controller 40 may also control the second light source 61 and the second reading section 60 similarly to the first controller 10 controlling the first light source 33 and the first reading section 32.

The second storage section 52 functions as a buffer which temporarily stores digital data which is being processed or which has been processed by the second image processor 51. The second storage section 52 supplies the temporarily-stored digital data to the output section 23 of the first controller 10 through the connection line 70 in a first-in first-out (FIFO) method.

The output section 23 transmits digital data supplied from the first storage section 22 or the second storage section 52 to an external information processing apparatus, such as a host including a personal computer, not illustrated, for example. The output section 23 is realized by an interface used to perform network connection or universal serial bus (USB) connection. The output section 23 transmits data stored in the first storage section 22 or the second storage section 52 to the host in a transfer speed corresponding to processing ability of the host.

The first reading section 32 and the second reading section 60 are disposed in a relative position with a transport path in the image reading apparatus 100 in which the document transported by the transport section 30 passes interposed therebetween. However, the first reading section 32 and the second reading section 60 may be disposed in a shifted manner along the transport path with the transport path interposed therebetween. For example, the first reading section 32 is disposed on an upstream side of the transport path relative to the second reading section 60. In the configuration in which the first reading section 32 is disposed on an upstream side of the transport path relative to the second reading section 60, after the first reading section 32 starts reading of the first plane of the document transported by the transport section 30, the second reading section 60 starts reading of the second plane when the document reaches a position of the second reading section 60. After the first reading section 32 terminates the reading of the first plane of the document transported by the transport section 30, the second reading section 60 stops reading of the second plane when the document has passed a position of the second reading section 60.

2. Reading Stop Control

In this embodiment, a process of ensuring synchronism of stop of reading of the first plane of the document and stop of reading of the second plane in the configuration of the image reading apparatus 100 described above will be described.

Figure 2:
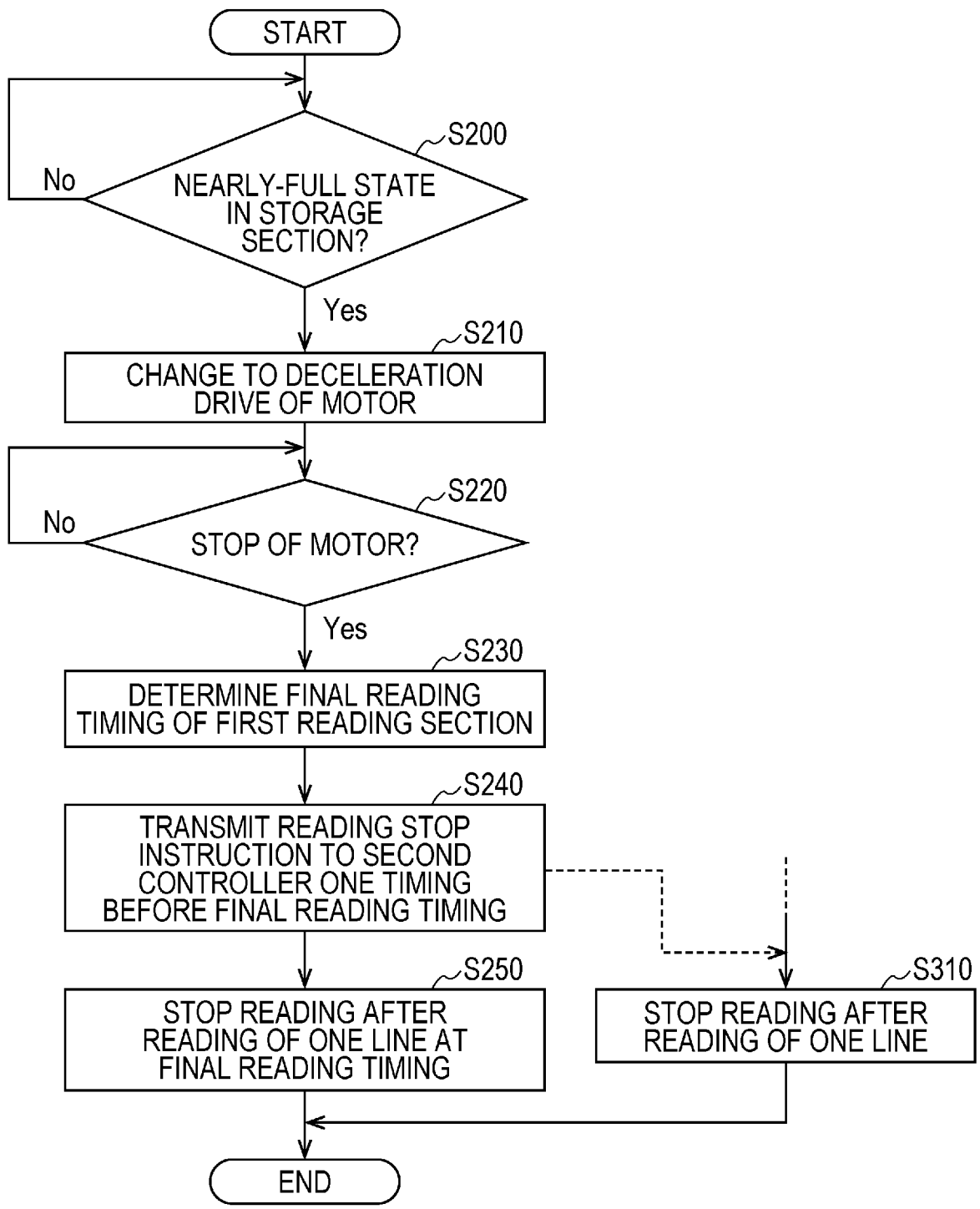
FIG. 2 is a flowchart of a reading stop control process.

FIG. 2 is a flowchart of a reading stop control process executed by the first controller 10. The first controller 10 starts the reading stop control process after start of a both-side reading control process. The both-side reading control process is a normal process starting from start of transport of the document by the transport section 30 to termination of the transport, that is, completion of discharge of the document to an outside of the image reading apparatus 100. According to the both-side reading control process, the reading of the first plane performed by the first reading section 32 and the reading of the second plane performed by the second reading section 60 are completed in a period of time from when transport of the document is started to when the transport is terminated. Note that it is assumed that the motor controller 13 drives the DC motor 31 in a constant speed when the reading stop control process is started.

After the reading stop control process is started, the first controller 10 determines whether at least one of the first storage section 22 and the second storage section 52 is in a nearly-full state in which a free space is equal to or smaller than a predetermined amount in step S200. When the determination is affirmative, the first controller 10 determines "Yes" in step S200 and proceeds to step S210. When a state in which both of the first storage section 22 and the second storage section 52 are not in the nearly-full state is continued and the both-side reading control process is terminated while a determination of "No" in step S200 is maintained, the reading stop control process is also terminated.

The nearly-full state of the first storage section 22 is entered when a free space to be used for storage in the first storage section 22 is reduced to a capacity (a predetermined amount) for storing a maximum amount of data read by the first reading section 32 in a period of time from when the deceleration drive is started in the DC motor 31 to when the reading is stopped by the first reading section 32, for example. Furthermore, the nearly-full state of the second storage section 52 is entered when a free space to be used for storage in the first storage section 52 is reduced to a capacity (a predetermined amount) for storing a maximum amount of data read by the second reading section 60 in a period of time from when the deceleration drive is started in the DC motor 31 to when the reading is stopped by the second reading section 60, for example. When detecting the nearly-full state, the first storage section 22 transmits a result of the detection of the nearly-full state to the first shift controller 15. Furthermore, when detecting the nearly-full state, the second storage section 52 transmits a result of the detection of the nearly-full state to the first shift controller 15. Accordingly, the first shift controller 15 determines "Yes" in step S200 when receiving the notification of a result of the detection indicating the nearly-full state from the first storage section 22 or the second storage section 52.

In step S210, the first shift controller 15 instructs the motor controller 13 to switch the driving of the DC motor 31 from the constant-speed drive to the deceleration drive. The motor controller 13 causes the DC motor 31 to perform the deceleration drive in response to this instruction. After the deceleration drive is entered, the motor controller 13 determines whether rotation of the DC motor 31 has been stopped based on a pulse output from the encoder of the DC motor 31. When determining that the rotation of the DC motor 31 has been stopped, the motor controller 13 determines "Yes" in step S220 and proceeds to step S230. When determining that the rotation of the DC motor 31 has been stopped, the motor controller 13 switches the control of the DC motor 31 from the deceleration drive to the stop control and maintains the state in which rotation of the DC motor 31 is stopped.

The stop of rotation of the DC motor 31 means stop of transport of the document by the transport section 30. The stop of rotation of the DC motor 31 is a condition for stop of reading of the document. Specifically, in this embodiment, the determination of "Yes" in step S220 corresponds to a determination of stop of reading of the document performed by the first controller 10.

In step S230, the first shift controller 15 determines a final reading timing of the first reading section 32 before reading of the first plane performed by the first reading section 32 is stopped.

The first shift controller 15 determines the final reading timing in accordance with a timing when it is determined that the reading of the document is stopped, that is, a timing when "Yes" is determined in step S220. Specifically, in a case where a timing when it is determined that the reading of the document is to be stopped corresponds to a timing when the first reading section 32 reads the first line data or the second line data, the first shift controller 15 determines a timing when the third line data included in a set including the first line data or the second line data is read as the final reading timing. On the other hand, in a case where the timing when it is determined that the reading of the document is to be stopped corresponds to a timing when the first reading section 32 reads the third line data, the first shift controller 15 determines a timing when third line data included in a next set after the set including this third line data is read as the final reading timing.

The first shift controller 15 transmits a reading stop instruction to the second controller 40 one timing before the final reading timing determined in step S230 (step S240). Here, the phrase "one timing before" means "before a predetermined time difference corresponding to a delay generated in the communication between the first controller 10 and the second controller 40 through the connection line 70". The communication between the first controller 10 and the second controller 40, e.g., communication between two SoCs described above, includes a certain delay. It is difficult to reduce the delay to 0. Therefore, in this embodiment, such a delay is presupposed, and the following circuit design is employed. That is, the "predetermined time difference" described above including the delay is included in the communication from the first controller 10 to the second controller 40 through the connection line 70 on purpose.

After step S240, the first shift controller 15 stops the reading performed by the first reading section 32 after the first reading controller 14 causes the first reading section 32 to execute reading on a last line at the final reading timing determined in step S230 before the stop of the reading of the first reading section 32 (step S250).

In FIG. 2, a portion of the process executed by the second controller 40 is illustrated as step S310. In the second controller 40 which has received the reading stop instruction transmitted from the first controller 10 in step S240, the second shift controller 43 stops the reading performed by the second reading section 60 after the second reading controller 42 causes the second reading section 60 to execute reading on one line (step S310). Needless to say, the reading performed by the first reading section 32 in a unit of line is repeatedly performed until step S250, and the reading performed by the second reading section 60 in a unit of line is repeatedly performed until step S310.

As described above, the transmission of the reading stop instruction from the first controller 10 to the second controller 40 is executed one timing before the final reading timing determined in step S230. Furthermore, the second controller 40 serving as a slave in the relationship with the first controller 10 immediately executes the process in accordance with the instruction supplied from the first controller 10. The second controller 40 receives the reading stop instruction transmitted by the first controller 10 in step S240 at the final reading timing determined in step S230, that is, a timing of step S250. Consequently, step S250 and step S310 are simultaneously executed. When the process in step S250 and the process in step S310 are executed by the reading stop control process, the both-side reading control process is interrupted.

Figure 3:
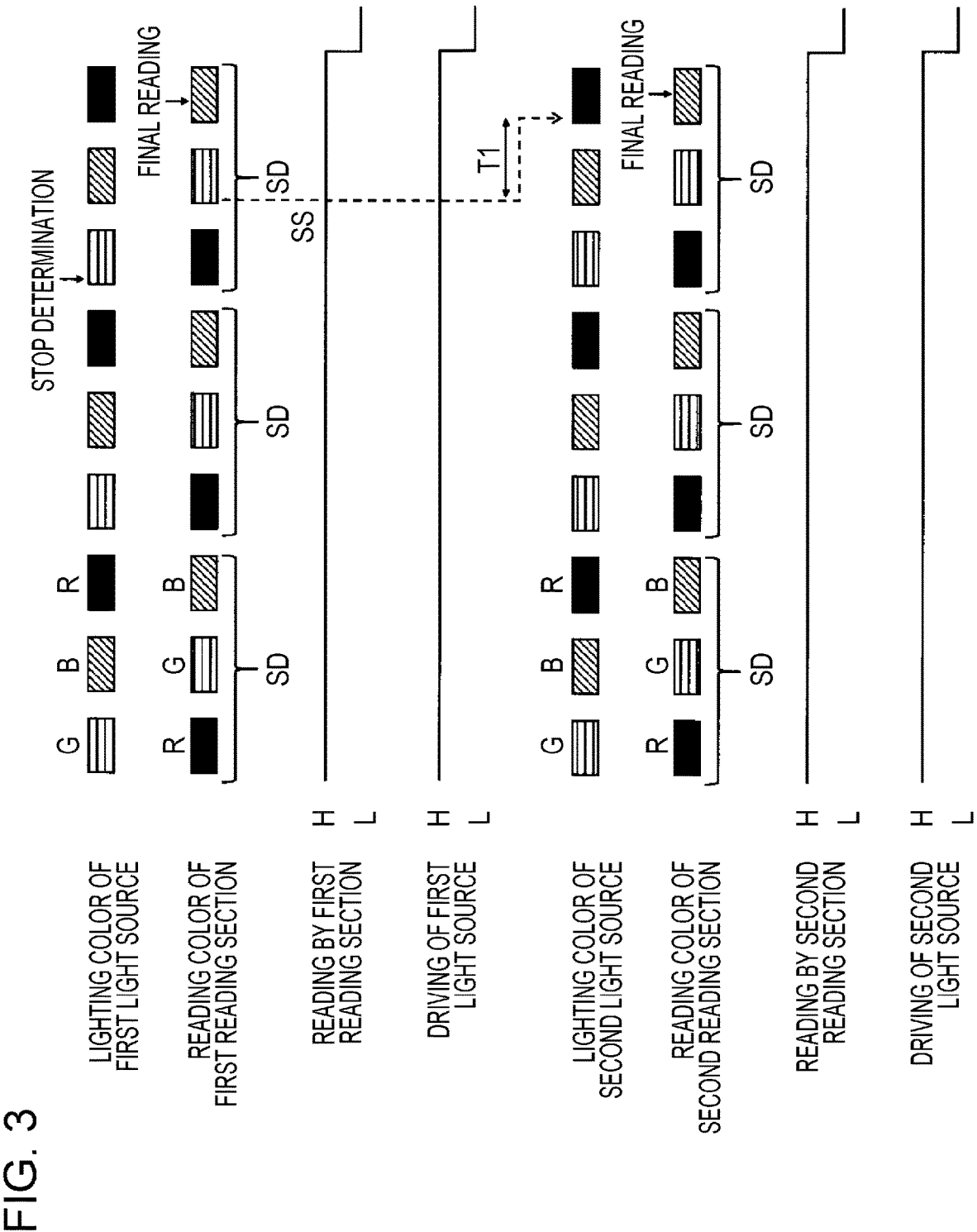
FIG. 3 is a timing chart illustrating a first concrete example of the reading stop control process.

FIG. 3 is a timing chart illustrating a first concrete example of the reading stop control process. Time elapses from left to right in FIG. 3. In FIG. 3, a term "lighting color of first light source" indicates timings when the first light source driving section 16 turns on the right (R) LED, the green (G) LED, and the blue (B) LED of the first light source 33 in turn. Similarly, a term "lighting color of second light source" indicates timings when the second light source driving section 44 turns on the right (R) LED, the green (G) LED, and the blue (B) LED of the second light source 61 in turn. A term "reading color of first reading section" in FIG. 3 indicates timings when the first reading controller 14 causes the first reading section 32 to read R, G, and B line data, that is, the first to third line data. Similarly, the term "reading color OF second reading section" indicates timings when the second reading controller 42 causes the second reading section 60 to read the individual R, G, and B line data in turn. In FIG. 3, a timing corresponding to R is indicated by a black rectangle, a timing corresponding to G is indicated by a border rectangle, and a timing corresponding to B is indicated by a hatched rectangle.

In this embodiment, reading of line data performed by the first reading section 32 means the following operation. That is, the first reading controller 14 applies a shift pulse to the first reading section 32 so that charge accumulated in the photoelectric conversion elements is transferred to the shift registers. Similarly, reading of line data performed by the second reading section 60 means the following operation. That is, the second reading controller 42 applies a shift pulse to the second reading section 60 so that charge accumulated in the photoelectric conversion elements is transferred to the shift registers.

In an example of FIG. 3, as is apparent from the relationship between the "lighting color of first light source" and the "reading color of first reading section" and the relationship between the "lighting color of second light source" and the "reading color of second reading section", charge (the first line data) accumulated in the photoelectric conversion elements when the lighting color is R is transferred to the shift registers when the lighting color is G. Similarly, charge (the second line data) accumulated in the photoelectric conversion elements when the lighting color is G is transferred to the shift registers when the lighting color is B. Similarly, charge (the third line data) accumulated in the photoelectric conversion elements when the lighting color is B is transferred to the shift registers when the lighting color is R. In FIG. 3, a reference symbol SD indicates a set of image data SD including R, G, and B line data successively read, that is, first to third line data.

As illustrated in FIG. 3, timings when the light emission colors R, G, and B of the first light source 33 are turned on and timings when the light emission colors R, G, and B of the second light source 61 are turned on are synchronized with each other, respectively. Furthermore, as illustrated in FIG. 3, timings when the first reading section 32 reads the first to third line data and timings when the second reading section 60 reads the first to third line data are synchronized with each other, respectively. The synchronization is realized when the first controller 10 issues an instruction to the second controller 40 based on the predetermined time difference. Specifically, the first controller 10 ensures the synchronization illustrated in FIG. 3 by transmitting an instruction for starting driving of the second light source 61 and the second reading section 60 to the second controller 40 earlier than start of driving of the first light source 33 and the first reading section 32 by the predetermined time difference when the first controller 10 starts or restarts the both-side reading control process.

The "stop determination" in FIG. 3 is performed when the first shift controller 15 determines that the reading of the document is stopped, that is, when the first shift controller 15 determines "Yes" in step S220.

When the stop determination timing corresponds to the timing when the first line data corresponding to the R data line is read as illustrated in FIG. 3, the first shift controller 15 determines that a timing when the third line data corresponding to the B data line included in a set including the first data line is read is the final reading timing in step S230. Note that the first line data is read in a period of time from when reading of third line data before the first line data is terminated to when reading of the first line data is terminated. Similarly, the second line data is read in a period of time from when reading of the first line data before the second line data is terminated to when reading of the second line data is terminated. Similarly, the third line data is read in a period of time from when reading of the second line data before the third line data is terminated to when reading of the third line data is terminated.

In the example of FIG. 3, the first shift controller 15 transmits a reading stop instruction SS to the second controller 40 at a timing when the second line data which is the G line data included in a set including the first line data in which the stop determination timing corresponds to the reading timing is read (step S240). Specifically, in the example of FIG. 3, an interval between readings of lines in the first reading section 32 and the second reading section 60, that is, an interval of a shift pulse supplied from the first reading controller 14 to the first reading section 32 (an interval of a shift pulse from the second reading controller 42 to the second reading section 60), corresponds to the predetermined time difference. In FIG. 3, a reference symbol Ti indicates the predetermined time difference.

According to the example of FIG. 3, the first shift controller 15 causes the first reading controller 14 to cause the first reading section 32 to read the third line data which is the B line data included in a set including the first line data in which the stop determination timing corresponds to the reading timing and causes the first reading section 32 to stop the reading in step S250. Specifically, the first reading controller 14 stops the transmission of the shift pulse to the first reading section 32 after transmitting the shift pulse for causing the first reading section 32 to read the third line data at the final reading timing. Furthermore, the first reading controller 14 stops output of charge stored in the shift registers of the first reading section 32 to the first AFE 20 when output, from the shift registers, of the third line data corresponding to the charge transferred to the shift registers at the final reading timing to the first AFE 20 is completed. In FIG. 3, "reading by first reading section" indicates that the reading performed by the first reading section 32 is stopped by the first reading controller 14 due to a change from a high level to a low level. Furthermore, in FIG. 3, as indicated by a change in "driving of first light source" from the high level to the low level, the first shift controller 15 causes the first light source driving section 16 to stop driving of the first light source 33 in response to the reading stop in step S250. Specifically, the first light source 33 is turned off.

According to the example of FIG. 3, the reading stop instruction SS transmitted from the first controller 10 in step S240 is received by the second controller 40 at the final reading timing determined in step S230, that is, a timing when the second controller 40 causes the second reading section 60 to read the third line data corresponding to the B line data. In step S310, the second shift controller 43 causes the second reading section 60 to stop the reading after causing the second reading controller 42 to cause the second reading section 60 to read data for one line, that is, the third line data which is the B line data in this case, in response to the reception of the reading stop instruction SS. Specifically, the second reading controller 42 stops the transmission of the shift pulse to the second reading section 60 after transmitting the shift pulse for causing the second reading section 60 to read the third line data. Furthermore, the second reading controller 42 stops output of charge stored in the shift registers of the second reading section 60 to the second AFE 50 when output, from the shift registers, of the third line data corresponding to the charge transferred to the shift registers at the final reading timing to the second AFE 50 is completed. In FIG. 3, "reading by second reading section" indicates that the reading performed by the second reading section 60 is stopped by the second reading controller 42 due to a change from a high level to a low level. Furthermore, in FIG. 3, as indicated by a change of "driving of second light source" from the high level to the low level, the second shift controller 43 causes the second light source driving section 44 to stop driving of the second light source 61 in response to the reading stop in step S310. Specifically, the second light source 61 is turned off.

Figure 4:
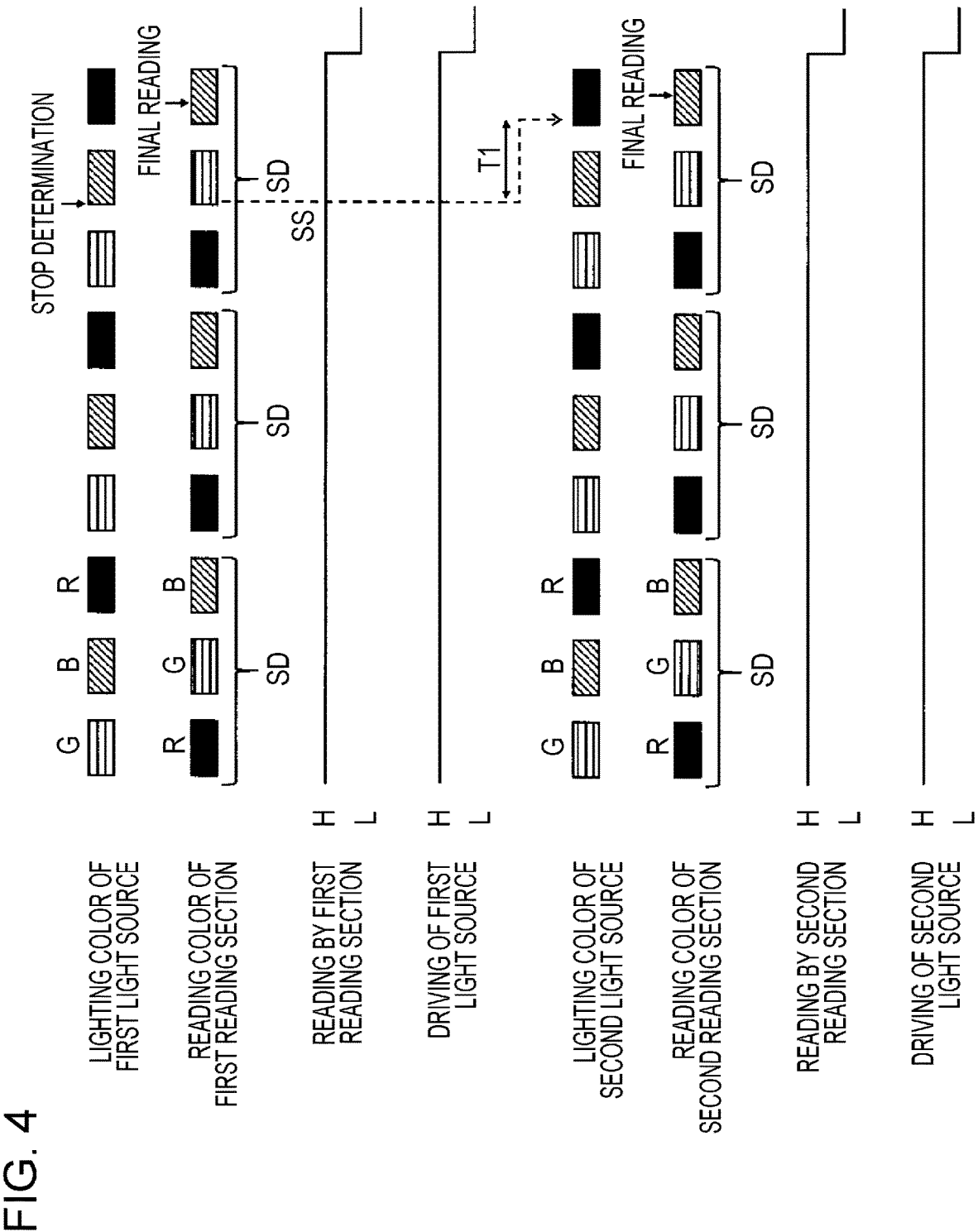
FIG. 4 is a timing chart illustrating a second concrete example of the reading stop control process.

FIG. 4 is a timing chart illustrating a second concrete example of the reading stop control process. FIGS. 3 and 4 are read in the same way. Only a timing of "stop determination" in FIG. 4 is different from that in FIG. 3.

When the stop determination timing corresponds to a timing when the second line data corresponding to the G data line is read as illustrated in FIG. 4, the first shift controller 15 determines that a timing when the third line data corresponding to the B data line included in a set including the second data line is read is the final reading timing in step S230. In the example of FIG. 4, the first shift controller 15 transmits the reading stop instruction SS to the second controller 40 at a timing when the second line data which is the G line data corresponding to the stop determination timing is read (step S240).

According to the example of FIG. 4, the first shift controller 15 causes the first reading controller 14 to cause the first reading section 32 to read the third line data which is the B line data included in a set including the second line data in which the stop determination timing corresponds to the reading timing and causes the first reading section 32 to stop the reading in step S250. Furthermore, according to the example of FIG. 4, the reading stop instruction SS transmitted from the first controller 10 in step S240 is received by the second controller 40 at the final reading timing determined in step S230, that is, a timing when the second controller 40 causes the second reading section 60 to read the third line data which is the B line data. In step S310, the second shift controller 43 causes the second reading section 60 to stop the reading after causing the second reading controller 42 to cause the second reading section 60 to read data for one line, that is, the third line data which is the B line data in this case, in response to the reception of the reading stop instruction SS.

Figure 5:
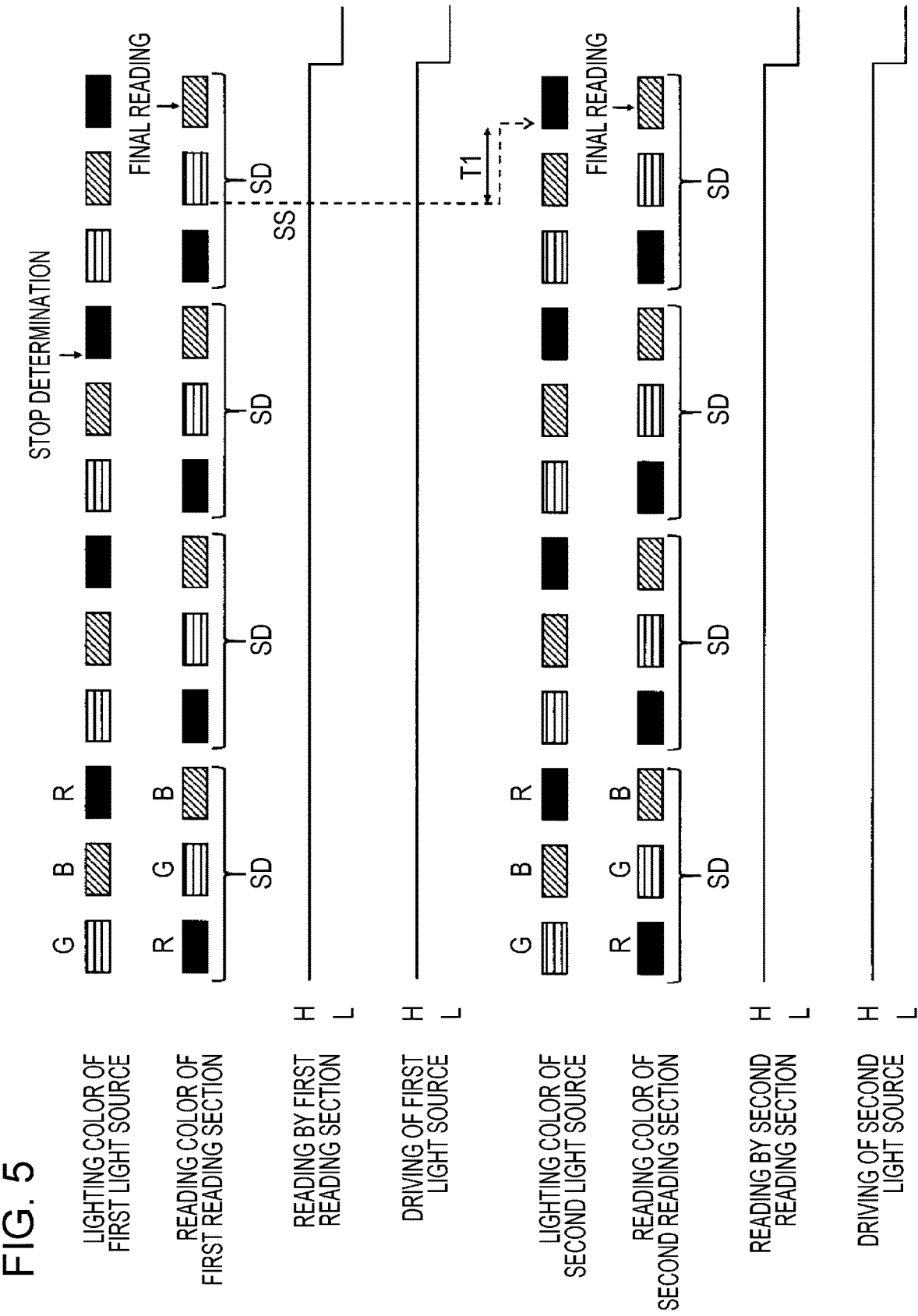
FIG. 5 is a timing chart illustrating a third concrete example of the reading stop control process.

FIG. 5 is a timing chart illustrating a third concrete example of the reading stop control process. FIGS. 3, 4, and 5 are read in the same way. First, a timing of "stop determination" in FIG. 5 is different from those in FIGS. 3 and 4.

When the stop determination timing corresponds to a timing when the third line data which is the B data line is read as illustrated in FIG. 5, the first shift controller 15 determines that a timing when third line data included in a set after a set including the third line data is read is the final reading timing in step S230. In the example of FIG. 5, the first shift controller 15 transmits the reading stop instruction SS to the second controller 40 at a timing when the second line data which is the G line data included in a set after the set including the third line data in which the stop determination timing corresponds to the reading timing is read (step S240).

According to the example of FIG. 5, the first shift controller 15 causes the first reading controller 14 to cause the first reading section 32 to read the third line data which is the B line data included in a set after the set including the third line data in which the stop determination timing corresponds to the reading timing and causes the first reading section 32 to stop the reading in step S250. Furthermore, according to the example of FIG. 5, the reading stop instruction SS transmitted from the first controller 10 in step S240 is received by the second controller 40 at the final reading timing determined in step S230, that is, a timing when the second controller 40 causes the second reading section 60 to read the third line data which is the B line data. In step S310, the second shift controller 43 causes the second reading section 60 to stop the reading after causing the second reading controller 42 to cause the second reading section 60 to read data for one line, that is, the third line data which is the B line data in this case, in response to the reception of the reading stop instruction SS.

According to the examples of FIGS. 3 to 5, the timing of the stop of the reading of the first reading section 32 and the timing of the stop of the reading of the second reading section 60 coincide with each other. Furthermore, according to the examples of FIGS. 3 to 5, the reading performed by the first reading section 32 and the reading performed by the second reading section 60 are stopped after the third line data which is the last in reading order is read among the first to third line data including a set of image data SD.

The first controller 10 may restart the both-side reading control process interrupted by the reading stop control process. As a result of the reading stop control process, after the reading performed by the first reading section 32 and the reading performed by the second reading section 60 are stopped, free spaces of the first storage section 22 and the second storage section 52 are increased as transmission of data from the output section 23 to the host progresses. Therefore, the first shift controller 15 of the first controller 10 monitors the first storage section 22 and the second storage section 52 after the interruption of the both-side reading control process and restarts the both-side reading control process when determining that free spaces of the first storage section 22 and the second storage section 52 which are equal to or larger than a predetermined threshold value are ensured. The free spaces equal to or larger than the predetermined threshold value are obviously larger than free spaces obtained in the nearly-full state. In this case, the first shift controller 15 controls the motor controller 13, the first light source driving section 16, and the first reading controller 14 so as to restart the driving of the DC motor 31, the driving of the first light source 33, and the reading of the first reading section 32. Furthermore, the first shift controller 15 transmits an instruction to the second controller 40 to restart the driving of the second light source 61 and the reading of the second reading section 60. Furthermore, the first controller 10 restart the reading stop control process after the both-side reading control process is restarted.

3. Conclusion

According to this embodiment, the image reading apparatus 100 capable of simultaneously reading both sides of a document includes the first reading section 32 which reads a first plane of the document in a unit of line, the second reading section 60 which reads a second plane which is a back side of the first plane of the document in a unit of line, the first controller 10 which controls the first reading section 32, and the second controller 40 which controls the second reading section 60 in accordance with an instruction issued by the first controller 10. When determining that the reading of the document is to be stopped, the first controller 10 stops the reading performed by the first reading section 32 after causing the first reading section 32 to read a last line before the reading performed by the first reading section 32 is stopped. Furthermore, the first controller 10 transmits an instruction for stopping the reading to the second controller 40 earlier, by a time difference corresponding to a delay generated in communication between the first controller 10 and the second controller 40, than a timing when the last line is read by the first reading section 32. The second controller 40 stops the reading performed by the second reading section 60 after causing the second reading section 60 to read one line in response to a reception of the reading stop instruction.

According to this configuration, the first controller 10 transmits the reading stop instruction to the second controller 40 the time difference before the timing when the last line is read before the reading of the first reading section 32 is stopped when determining that the reading of the document is to be stopped. As a result, a timing of the stop of the reading performed by the first reading section 32 and a timing of the stop of the reading performed by the second reading section 60 may coincide with each other. Accordingly, a case where the second reading section 60 reads a larger number of lines than the first reading section 32 after the first controller 10 determines that the reading is to be stopped may be avoided. If the number of lines read by the first reading section 32 before the reading is stopped after it is determined that the reading of the document is to be stopped is different from that read by the second reading section 60, image quality of a portion of connection between data read before the reading stop and data read after restart of reading as a reading result obtained by the first reading section 32 (a result of reading on the first plane) and that obtained by the second reading section 60 (a result of reading on the second plane) are different from each other, and the user recognizes that the portion as deterioration of quality of both-side reading. In this embodiment, image quality of the connection portion obtained as the result of the reading performed by the first reading section 32 (the result of reading on the first plane) and that obtained as the result of the reading performed by the second reading section 60 (the result of reading on the second plane) are not different from each other or have a negligible difference.

Furthermore, according to this embodiment, the first controller 10 repeatedly obtains a set of image data including the first to third line data by causing the first reading section 32 to repeatedly read the first line data corresponding to image data in a unit of line of the first color selected from among R, G, and B, the second line data corresponding to image data in a unit of line of the second color selected from among R, G, and B, and the third line data corresponding to image data in a unit of line of the third color selected from among R, G, and B in this order from the first plane of the document. Similarly, the second controller 40 may also repeatedly obtain a set of image data including first to third line data by causing the second reading section 60 to repeatedly read the first to third line data in this order from the second plane of the document.

Furthermore, when a timing when the reading of the document is determined to be stopped coincides with a timing when the first reading section 32 reads the first line data or the second line data, the first controller 10 causes the first reading section 32 to read the third line data included in a set including the first line data or the second line data in which the timing when it is determined that the reading on the document is to be stopped coincides with the timing when the first reading section 32 performs reading as a last line before the first reading section 32 stops reading. Furthermore, when a timing when the reading of the document is determined to be stopped coincides with a timing when the first reading section 32 reads the third line data, the first controller 10 causes the first reading section 32 to read third line data included in a set after the set including the third line data in which the timing when it is determined that the reading of the document is to be stopped coincides with the timing when the first reading section 32 performs reading as a last line before the first reading section 32 stops reading.

According to this configuration, a timing when the first reading section 32 stops reading and a timing when the second reading section 60 stops reading may coincide with each other, and the reading performed by the first reading section 32 and the reading performed by the second reading section 60 may be stopped after the third line data which is the last in the reading order is read among the first to third line data included in a set of image data. A difference in image quality of the connection portion between the result of the reading performed by the first reading section 32 (the result of reading on the first plane) and the result of the reading performed by the second reading section 60 (the result of reading on the second plane) may be suppressed by stopping the reading of the first reading section 32 and the reading of the second reading section 60 after the third line data is read.

Furthermore, according to this embodiment, the image reading apparatus 100 includes the first storage section 22 which stores data read by the first reading section 32, the second storage section 52 which stores data read by the second reading section 60, and the transport section 30 which transports a document. When at least one of the first storage section 22 and the second storage section 52 is in a nearly-full state in which a free space is equal to or smaller than a predetermined amount, the first controller 10 stops the transport of the document by the transport section 30 and determines that the reading of the document is stopped after the transport of the document is stopped.

According to the configuration described above, when the first storage section 22 and/or the second storage section 52 is in the nearly-full state, the transport of the document may be stopped and the timing when the reading of the first reading section 32 is stopped and the timing when the reading of the second reading section 60 is stopped after the transport of the document is stopped may coincide with each other. Accordingly, the number of lines read by the first reading section 32 and the number of lines read by the second reading section 60 may coincide with each other in the state in which the transport of the document is stopped. Consequently, a difference between image quality of the connection portion obtained as a result of the reading performed by the first reading section 32 (the result of reading on the first plane) and that obtained as a result of the reading performed by the second reading section 60 (the result of reading on the second plane) may be further suppressed.

Furthermore, according to this embodiment, an image reading method executed by the image reading apparatus 100 is disclosed. Specifically, the image reading method includes a reading control step of performing reading on the first plane of the document in a unit of line using the first reading section 32 and reading on the second plane of the document in a unit of line using the second reading section 60 in parallel, a first stop control step of stopping, when the reading of the document is to be stopped, the reading performed by the first reading section 32 after causing the first reading section 32 to read a last line before the reading performed by the first reading section 32 is stopped and transmitting a reading stop instruction from the first controller 10 to the second controller 40 earlier than a timing when the first reading section 32 reads the last line by a time difference corresponding to a delay generated in communication between the first controller 10 which controls the first reading section 32 and the second controller 40 which controls the second reading section 60, and a second stop control step of stopping the reading performed by the second reading section 60 in response to the reading stop instruction after the second controller 40 causes the second reading section 60 to read one line.

4. Other Embodiments

In the reading stop control process of FIG. 2, the DC motor 31 may be stopped for any reason in addition to the reason that one of the first storage section 22 and the second storage section 52 becomes the nearly-full state. For example, the first controller 10 may monitor temperature of the DC motor 31 using a temperature sensor, not illustrated, and when the temperature of the DC motor 31 becomes equal to or higher than a predetermined temperature threshold value, the process may proceeds to step S210. Furthermore, the first controller 10 may stop the DC motor 31 when a transport failure, such as a sheet jam, occurs during the transport of the document performed by the transport section 30 and proceed to step S230 onwards after the DC motor 31 is stopped.

When the number of lines read by the first reading section 32 in a period of time from when the determination is affirmative in step S220 in FIG. 2 to when the reading of the first reading section 32 is stopped in step S250 and the number of lines read by the second reading section 60 in a period of time from when the determination is affirmative in step S220 in FIG. 2 to when the reading of the second reading section 60 is stopped in step S310 are different from each other, line data corresponding to the difference may be deleted in the storage section. It is assumed that the number of lines read by the second reading section 60 in the period of time from when the determination is affirmative in step S220 in FIG. 2 to when the reading of the second reading section 60 is stopped in step S310 is larger by 1 than the number of lines read by the first reading section 32 in the period of time from when the determination is affirmative in step S220 in FIG. 2 to when the reading of the first reading section 32 is stopped in step S250. In this case, the first controller 10 instructs the second controller 40 to delete single line data which is read by the second reading section 60 as a last line read before the second reading section 60 is stopped and which is stored in the second storage section 52. The second controller 40 deletes the single line data which is a last line read by the second reading section 60 before the second reading section 60 is stopped and which is stored in the second storage section 52. With this configuration, a situation in which the number of lines read by the first reading section 32 and that read by the second reading section 60 before the reading is stopped after the first controller 10 determines that the reading on the document is to be stopped are different from each other may be solved ex post facto.

The first reading section 32 and the second reading section 60 serving as line sensors are not limited to monochrome image sensors, and may be color image sensors capable of outputting data having information on a plurality of colors, such as R, G, and B, by performing reading in a unit of line.

What is claimed is:

1. An image reading apparatus which simultaneously reads both sides of a document, the image reading apparatus comprising:
    a first reading section configured to read a first plane of the document in a unit of line;
    a second reading section configured to read a second plane which is a back side of the first plane of the document in a unit of line;
    a first controller configured to control the first reading section, the first control including a first CPU; and
    a second controller configured to control the second reading section in accordance with an instruction issued by the first controller, the second controller including a second CPU, wherein,
    the first controller and the second controller are connected together by a connection line configured to provide direct communication between the first controller and the second controller, an operation of the second controller being controlled by the first controller, wherein
    when determining stop of reading of the document, the first controller stops the reading performed by the first reading section after causing the first reading section to read a last line before the reading performed by the first reading section is stopped and transmits a reading stop instruction to the second controller earlier than a timing when the first reading section reads the last line by a time difference corresponding to a delay generated in communication between the first and second controllers, and
    the second controller stops reading performed by the second reading section after causing the second reading section to read one line in response to the reading stop instruction.

2. The image reading apparatus according to claim 1, wherein the first controller causes the first reading section to repeatedly read, from the first plane, first line data which is image data in a unit of line of a first color selected from among red, green, and blue, second line data which is image data in a unit of line of a second color selected from among red, green, and blue, and third line data which is image data in a unit of line of a third color selected from among red, green, and blue in this order, so as to repeatedly obtain a set of image data including the first line data, the second line data, and the third line data, and the second controller causes the second reading section to repeatedly read the first line data, the second line data, and the third line data in this order from the second plane so as to repeatedly obtain a set of image data including the first line data, the second line data, and the third line data.

3. The image reading apparatus according to claim 2, wherein when a timing when reading of the document is stopped coincides with a timing when the first reading section reads the first line data or the second line data, the first controller causes the first reading section to read the third line data included in the set including the first line data or the second line data in which the timing when the reading of the document is stopped coincides with the timing when the first reading section performs reading as a last line before the reading performed by the first reading section is stopped.

4. The image reading apparatus according to claim 2, wherein when a timing when reading of the document is stopped coincides with a timing when the first reading section reads third line data, the first controller causes the first reading section to read third line data included in a set after the set including the third line data in which the timing when the reading of the document is stopped coincides with the timing when the first reading section performs reading as a last one line before the reading performed by the first reading section is stopped.

5. The image reading apparatus according to claim 1, the image reading apparatus comprising:

a first storage configured to store data read by the first reading section;

a second storage configured to store data read by the second reading section; and a transport section configured to transport the document, wherein when at least one of the first and second storages is in a nearly-full state in which a free space is equal to or smaller than a predetermined amount, the first controller causes the transport section to stop transport of the document and determines that reading of the document is stopped after the transfer of the document is stopped.

6. An image reading method which simultaneously reads both sides of a document, the image reading method comprising:

a reading control step of performing reading on the first plane of the document in a unit of line using a first reading section and reading on the second plane which is a back side of the first plane of the document in a unit of line using a second reading section in parallel;

a first stop control step of stopping, when the reading of the document is to be stopped, the reading performed by the first reading section after causing the first reading section to read a last line before the reading performed by the first reading section is stopped and transmitting a reading stop instruction from a first controller to a second controller earlier than a timing when the first reading section reads the last line by a time difference corresponding to a delay generated in communication between the first controller which controls the first reading section and the second controller which controls the second reading section, the first controller comprising a first CPU and the second controller comprising a second CPU, the first controller and the second controller are connected together by a connection line configured to provide direct communication between the first controller and the second controller so that an operation of the second controller is controlled by the first controller; and a second stop control step of stopping the reading performed by the second reading section in response to the reading stop instruction after the second controller causes the second reading section to read one line.

* * * * *